United States Patent
Chaintreuil et al.

(10) Patent No.: US 10,778,142 B2
(45) Date of Patent: Sep. 15, 2020

(54) METHOD AND DEVICE FOR EVALUATING THE ENERGY PRODUCED BY AN ELECTRIC ARC IN A PHOTOVOLTAIC INSTALLATION

(71) Applicants: COMMISSARIAT A L'ENERGIE ATOMIQUE ET AUX ENERGIES ALTERNATIVES, Paris (FR); SOCOMEC, Benfeld (FR)

(72) Inventors: Nicolas Chaintreuil, Montmelian (FR); Stéphane Siat, Obenheim (FR)

(73) Assignees: COMMISSARIAT A L'ENERGIE ATOMIQUE ET AUX ENERGIES ALTERNATIVES, Paris (FR); SOCOMEC, Benfeld (FR)

( * ) Notice: Subject to any disclaimer, the term of this patent is extended or adjusted under 35 U.S.C. 154(b) by 288 days.

(21) Appl. No.: 15/780,117

(22) PCT Filed: Dec. 1, 2016

(86) PCT No.: PCT/EP2016/079468
§ 371 (c)(1),
(2) Date: May 30, 2018

(87) PCT Pub. No.: WO2017/093422
PCT Pub. Date: Jun. 8, 2017

(65) Prior Publication Data
US 2018/0375467 A1    Dec. 27, 2018

(30) Foreign Application Priority Data
Dec. 1, 2015  (FR) ...................... 15 61628

(51) Int. Cl.
*H02S 50/00* (2014.01)
*H02S 50/15* (2014.01)
(Continued)

(52) U.S. Cl.
CPC ........... *H02S 50/00* (2013.01); *H02H 1/0015* (2013.01); *H02H 1/0092* (2013.01); *H02H 7/20* (2013.01); *H02S 50/15* (2014.12)

(58) Field of Classification Search
CPC ....... H02S 50/00; H02S 50/15; H02H 1/0015; H02H 1/0092; H02H 7/20
(Continued)

(56) References Cited

U.S. PATENT DOCUMENTS

2009/0308734 A1* 12/2009 Krauss ............... H01J 37/32935
                                                     204/192.13
2011/0141644 A1*  6/2011 Hastings ............ H02H 1/0015
                                                       361/93.2
2015/0357972 A1   12/2015 Lespinats et al.

FOREIGN PATENT DOCUMENTS

FR   3 002 645 A1   8/2014
FR   3 044 487 A1   6/2017

OTHER PUBLICATIONS

Schimpf et al., "Recognition of Electric Arcing in the DC-wiring of Photovoltaic Systems", XP31579534, Intelec 09: 31st International Telecommunications Energy Conference; Incheon, Korea, Oct. 18-22, 2009, IEEE, Piscataway, NJ, Oct. 18, 2009, 6 pages; cited in the ISR (in English).

(Continued)

*Primary Examiner* — Kevin J Comber
(74) *Attorney, Agent, or Firm* — Westerman, Hattori, Daniels & Adrian, LLP

(57) ABSTRACT

The invention relates to a method including the steps of measuring (E0) an electric current signal produced by the apparatus (100) at a sampling rate no lower than 50 kHz, and, from the measured current signal, determining (E3) an initial value (10) of the current before the occurrence of an electric arc, determining (E5) current values (Iarcj) during the electric arc, evaluating (E6) arc voltage values from the (Continued)

current values determined during the arc and from the initial value of the current, integrating (E7) over time the product of the arc voltage values evaluated by the determined current values, in order to determine the energy of the arc.

19 Claims, 5 Drawing Sheets

(51) Int. Cl.
    *H02H 1/00* (2006.01)
    *H02H 7/20* (2006.01)
(58) Field of Classification Search
    USPC .......................................................... 361/87
    See application file for complete search history.

(56) References Cited

OTHER PUBLICATIONS

Koziy et al., "A Low-Cost Power-Quality Meter With Series Arc-Fault Detection Capability for Smart Grid", XP11515987, IEEE Transactions on Power Delivery, vol. 28, No. 3, Jul. 2013, pp. 1584-1589; cited in the ISR.
International Search Report and Written Opinion dated Jan. 17, 2017 issued in corresponding application No. PCT/EP2016/079468; w/ English partial translation and partial machine translation (19 pages).

* cited by examiner

METHOD AND DEVICE FOR EVALUATING THE ENERGY PRODUCED BY AN ELECTRIC ARC IN A PHOTOVOLTAIC INSTALLATION

TECHNICAL FIELD OF THE INVENTION

The invention relates to a method and a device for evaluating the energy produced by an electric arc in a photovoltaic installation. It also relates to a photovoltaic installation equipped with such a device.

PRIOR ART

Electric arcs are liable to occur in photovoltaic installations.

An electric arc may occur in the event of a conductor fault or in the event of a faulty connection (for example following the opening of a live connector or on account of corrosion of a conductor). It is formed by a plasma that appears between two electrodes. Said electrodes may be formed by the two ends of a conductor or by two parts of a connector that is open or locally interrupted (on account of corrosion for example). The appearance of an electric arc is accompanied by a positive voltage jump or edge of short duration, of the order of a few microseconds. The initial arc voltage $V_{arc0}$ has a value that is characteristic of the appearance of an electric arc and that depends on the material of the electrodes. It is generally between 10 V and 30 V. For example, in the case of electrodes made of copper, the initial arc voltage $V_{arc0}$ is of the order of 20 V. The plasma of the electric arc performs the role of a resistance that increases over time. The initial voltage edge is therefore generally followed by a gradual increase in the arc voltage, which may continue until it reaches an open circuit voltage.

Photovoltaic installations have the feature that they operate with DC electric current and voltage, which may prove problematic in the event of the appearance of an electric arc linked to a fault. Specifically, with DC current and voltage, there is no natural quenching of the electric arc through a zero-crossing of the voltage and of the current, as is the case with AC current. The result of this is that an electric arc linked to a fault is liable to generate a plasma that releases a very large amount of heat for a significant period, and that therefore produces a lot of energy within a photovoltaic installation. Such a plasma is destructive and may start a fire. For safety reasons, it is therefore essential to detect the presence of a possible electric arc within a photovoltaic installation and to interrupt it in good time in order to prevent any damage or starting of a fire. To this end, the photovoltaic installation is equipped with an arc detection device, or arc detector. The latter is generally associated with an intervention or arc-quenching device that is intended to intervene so as to interrupt the electric arc and prevent any damage or starting of a fire.

An electric arc may also occur, during normal operation, in an electromagnetic control and/or protection unit, upon opening or upon closure of contacts or poles. For example, upon opening, a disconnecting switch generates an electric arc of a duration less than or equal to a known maximum duration. Arc-quenching means generally make it possible to interrupt the arc so that it does not last beyond a predefined maximum arc duration.

There are various methods, some of which are very fast, for detecting the presence of an electric arc in a photovoltaic installation. In the event of an electric arc linked to the opening of a disconnecting switch or other electromechanical unit when live, this risks causing a positive arc detection followed by unwanted shutdown of the photovoltaic installation, which is not desirable.

Moreover, an electric arc linked to a fault in the photovoltaic installation may have a duration that may range from a few microseconds to several minutes, or even several hours under certain particular conditions. For example, in the event of a discontinuous electric arc formed of a succession of micro-arcs of short durations and that are separated by periods without an arc, each micro-arc is not a priori dangerous in itself, but the energy accumulated by the succession of these micro-arcs may become critical for the environment and/or the installation over time.

For the reasons that have just been outlined, it appears to be useful to evaluate the level of energy released by an electric arc, for the purpose in particular of ascertaining the danger thereof to the photovoltaic installation and/or the environment.

SUBJECT OF THE INVENTION

To this end, the invention relates to a method for evaluating the electrical energy produced by an electric arc in a photovoltaic installation, comprising the following steps:
A) Measuring an electric current signal produced by the installation at a sampling frequency greater than or equal to 50 kHz and, from the measured current signal:
   Determining an initial value of the current before an electric arc appears;
   Determining current values during the electric arc;
B) Evaluating values of an arc voltage from the current values determined during the arc and from the initial value of the current;
C) Integrating, over time, the product of the evaluated arc voltage values and the determined current values, in order to determine the energy of the arc.

According to the invention, the electrical energy generated by an electric arc occurring within the photovoltaic installation is evaluated from a simple measurement of the current produced by the installation, at a high sampling frequency. The measurement device may therefore comprise a simple current measurement sensor.

In one particular embodiment, to evaluate each arc voltage value, the difference between a current value determined during the arc and the initial current value is calculated, and said difference is multiplied by the ratio between a magnitude of a voltage jump linked to the appearance of the electric arc and a magnitude of a current jump linked to the appearance of the electric arc.

According to the invention, the arc voltage is evaluated from the measured current. This evaluation is based on a linear reconstruction from the measured current. Each evaluated arc voltage value is proportional to the difference between a current value during the arc and the initial current, by a proportionality factor that is equal to the ratio between the magnitude of the voltage jump and the magnitude of the current jump, which jumps are linked to the appearance of the arc.

Advantageously, the method comprises a step of breaking down the current signal into a plurality of acquisition windows, and, for each acquisition window, a step of determining an average value of the current, said average value being recorded in memory.

In one particular embodiment, in the integration step, an arc energy for each acquisition window is calculated by taking the product of the average value of the current measured over said window, of the evaluated voltage value and of a duration of the acquisition window, and then summing the arc energies calculated in relation to a succession of acquisition windows.

In one variant embodiment, in the event of a discontinuous electric arc including a plurality of micro-arcs, steps B) and C) are implemented in order to determine the energy of each electric micro-arc, and then the respective energies of the electric micro-arcs are summed in order to determine the energy of the discontinuous electric arc.

In one particular embodiment, the initial value of the current is equal to the average value of the current in relation to at least one acquisition window preceding the one that contains the current jump.

The value of the voltage jump may be predefined and between 12 V and 35 V, for example equal to 20 V.

Advantageously, the magnitude of the current jump is determined from the measured current signal.

In one particular embodiment, the method comprises a step of comparing the determined energy of the electric arc with an energy threshold, and a protection step if said threshold is exceeded.

The invention also relates to a device for evaluating the energy released by an electric arc in a photovoltaic installation, characterized in that it comprises:
- a module for obtaining an electric current signal produced by the installation;
- a module for processing the current signal, designed to determine an initial value of the current before an electric arc appears and current values during the electric arc;
- a module for evaluating arc voltage values from the determined current values and from the initial value of the current;
- a module for integrating, over time, the product of the evaluated arc voltage values and the determined current values, in order to determine the energy of the arc.

The device advantageously comprises all or some of the following additional features:
- the module for evaluating arc voltage values is designed to calculate the difference between a current value determined during the arc and the initial current value and multiply said difference by the ratio between a magnitude of a voltage jump linked to the appearance of the electric arc and a magnitude of a current jump linked to the appearance of the electric arc;
- the module for processing the current signal is designed to break down the current signal into a plurality of acquisition windows, and, for each acquisition window, determine an average current value measured over said window, said average current value being recorded in memory;
- the integration module is designed to calculate, for each acquisition window, an arc energy by taking the product of the average value of the current measured over said window, of the evaluated voltage value and of a duration of the acquisition window, and then to sum the arc energies calculated in relation to a succession of acquisition windows.

The invention also relates to a safety system for a photovoltaic installation, characterized in that it comprises a device for detecting an electric arc, a device for evaluating the energy released by the detected electric arc, such as defined above, and an intervention device intended to protect the photovoltaic installation in the event of an electric arc.

The invention also relates to a photovoltaic installation comprising the safety system defined above.

BRIEF DESCRIPTION OF THE DRAWINGS

The invention will be better understood with the aid of the following description of one particular embodiment of the method and of the device for evaluating the energy produced or generated by an electric arc in a photovoltaic installation, of a safety system for a photovoltaic installation incorporating such an evaluation device, and of a photovoltaic installation equipped with this safety system, with reference to the appended drawings, in which.

DETAILED DESCRIPTION OF PARTICULAR EMBODIMENTS OF THE INVENTION

The invention aims to evaluate the energy generated or produced by an electric arc occurring within a photovoltaic installation 100.

Figure 1:
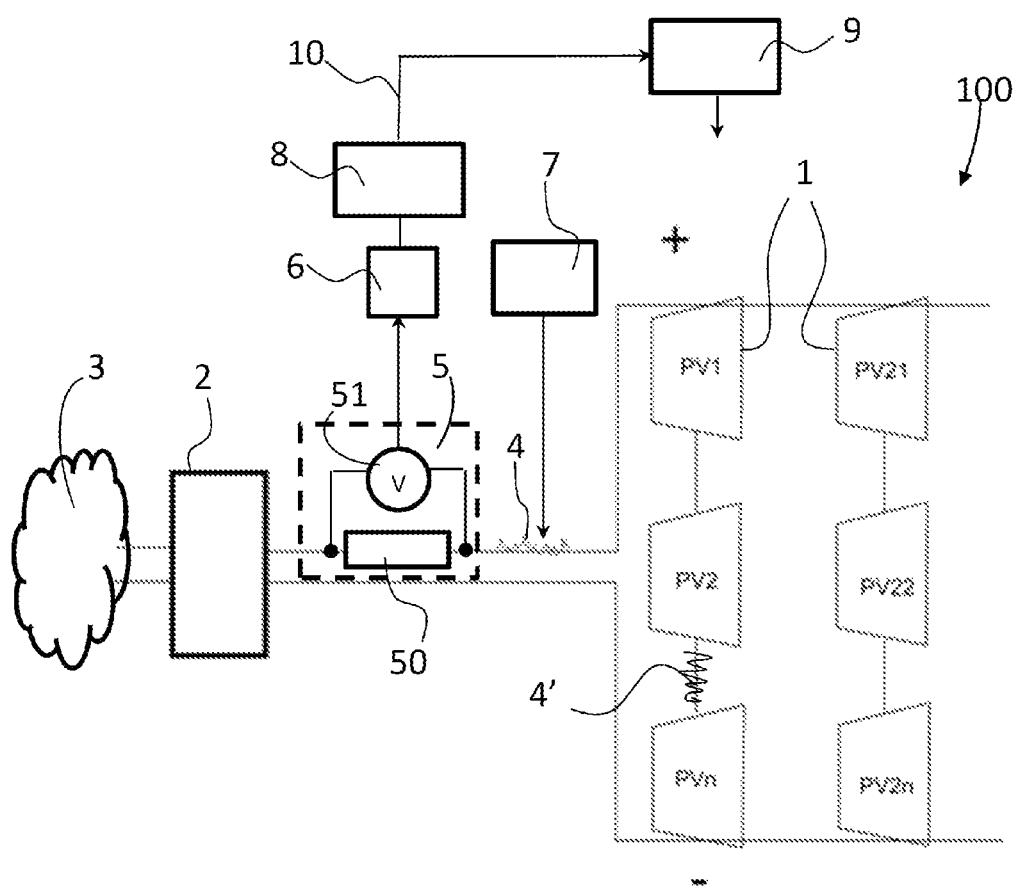
FIG. 1 shows a diagram of a photovoltaic installation according to one exemplary embodiment of the invention.

FIG. 1 schematically shows an example of a photovoltaic installation 100 able to produce a DC current I. Said installation comprises, in a known manner, a plurality of photovoltaic (PV) modules 1 linked to an inverter 2. The PV modules 1 are identical in this case. The PV modules 1 may be connected in series, in parallel or in a combination of both. A chain of PV modules connected in series is called a 'string'. For example, as shown in FIG. 1, the installation 100 comprises a plurality of strings, or chains, of m PV modules 1 that are connected in parallel. The inverter 2 is intended to convert the DC current I produced by the photovoltaic modules 1 into an AC current, and to supply this to an electrical grid 3.

The method of the invention seeks to evaluate the energy released or produced by an electric arc whose presence is detected within a photovoltaic installation 100. An electric arc may be linked to a fault, and may occur at any location in the installation 100, for example between the photovoltaic modules 1 and the inverter 2 (as shown by the electric arc 4 in FIG. 1), or within a photovoltaic module 1, or else on a link linking a plurality of photovoltaic modules 1 in series (as shown by the electric arc 4' in FIG. 1). An electric arc may also occur during normal operation of the installation 100, within an electromechanical unit, for example within a disconnecting switch (not shown in FIG. 1), upon opening of the contacts of the latter when live. In this case, the unit is equipped with arc-quenching means that make it possible to quench the electric arc quickly.

Figure 2:
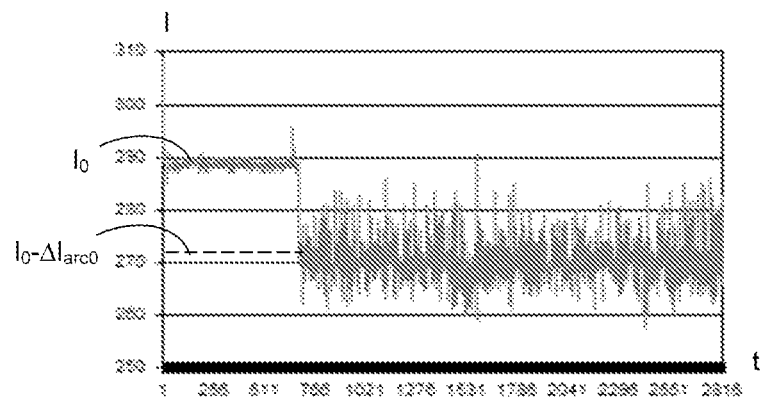
FIG. 2 shows an example of a measured electric current signal produced by the installation of FIG. 1, incorporating a current jump linked to an electric arc.
Figure 5:
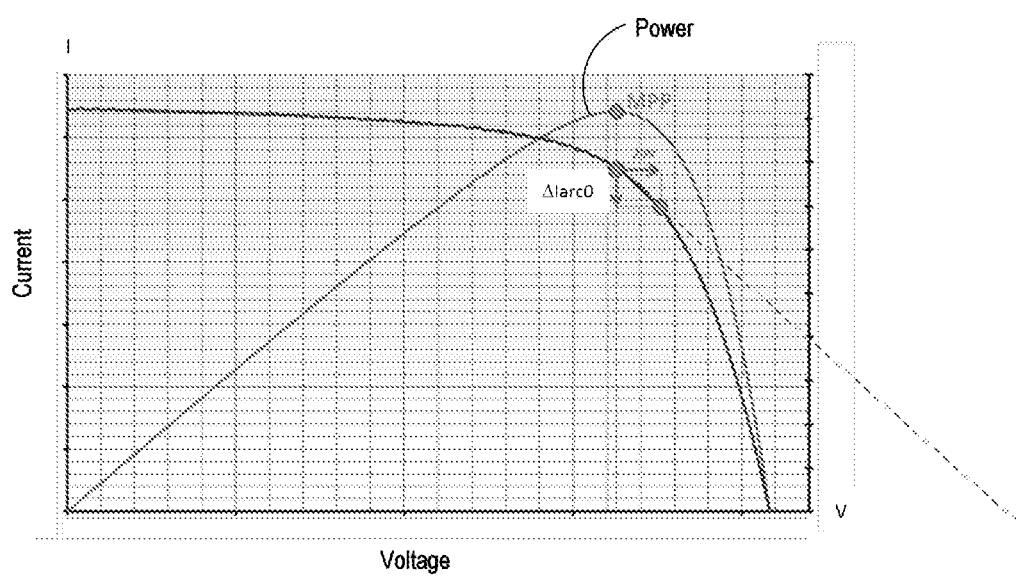
FIG. 5 shows an example of the current-voltage characteristic of a photovoltaic module of the installation of FIG. 1 and the corresponding power curve as a function of the voltage.

An electric arc, whether it is linked to a fault or not, causes a significant voltage variation within the electrical installation 100. Specifically, the appearance of the electric arc is characterized by a positive voltage jump or edge, of a duration of the order of a few microseconds and with a magnitude equal to a characteristic initial arc voltage $V_{arc0}$. The value of this initial arc voltage $V_{arc0}$ is typically between 12 V and 35 V. It depends on the material forming the electrodes between which the electric arc forms. For example, if the electrodes are made of copper, the initial arc voltage $V_{arc0}$ is equal, or substantially equal, to 20 V. When an electric arc appears in the photovoltaic installation 100, be it an electric arc linked to a fault (for example the arc 4 or 4') or an electric arc linked to the opening of the disconnecting switch when live, the voltage across the terminals of one or more photovoltaic modules 1 (in the scenario where the arc occurs outside of the module(s) under consideration) increases sharply on account of the initial arc voltage $V_{arc0}$ and the current I produced by the photovoltaic installation also drops sharply by a value $\Delta I_{arc0}$. This value $\Delta I_{rac0}$ depends on the position of the operating point on the current-voltage curve, or I-V characteristic curve, of the photovoltaic module(s). FIG. 5 shows a voltage jump of 20 V from the maximum power point MPP of one or more PV modules and the corresponding current jump $\Delta I_{arc0}$, which jumps are caused by the appearance of an electric arc. FIG. 2 shows, by way of illustrative example, a negative current jump linked to the appearance of an electric arc, in this case a continuous electric arc of long duration caused by a fault within the photovoltaic installation 100.

Figure 3:
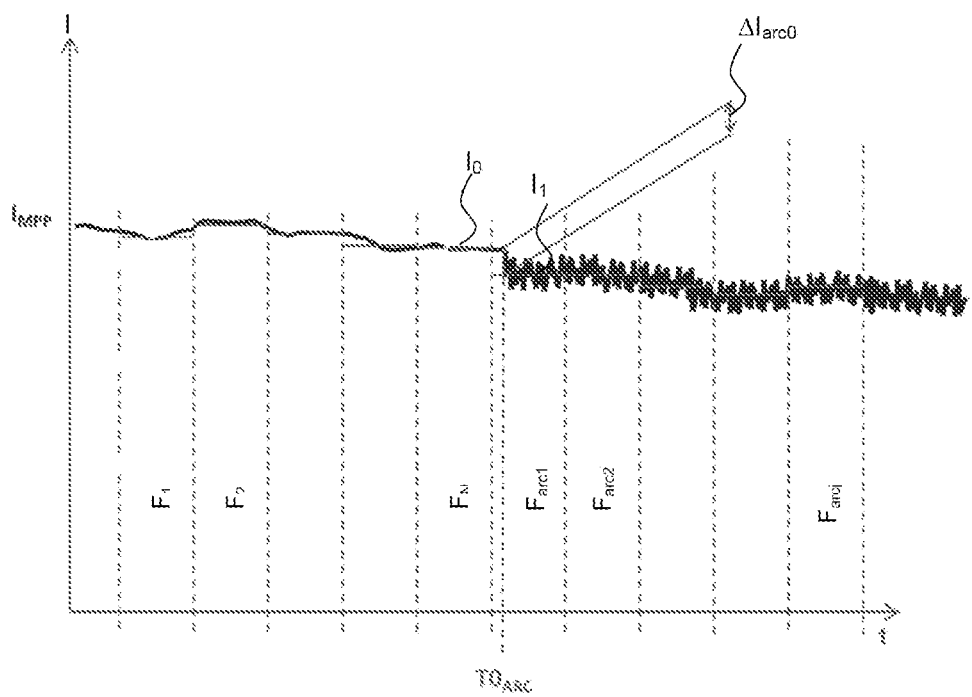
FIG. 3 shows a first example of an electric current signal produced by the photovoltaic installation of FIG. 1, broken down into acquisition windows and incorporating a current jump linked to the appearance of a continuous electric arc within the installation.

FIG. 3 shows a first example of an electric current signal I produced by the photovoltaic installation 100 and measured by a current measurement sensor. This signal incorporates a negative current jump linked to the appearance of a continuous electric arc of long duration that is caused by a fault. The current signal is broken down into a succession of acquisition windows, each acquisition window having a duration of between 10 μs and 100 ms, denoted:

$F_i$, where $1 \leq i \leq N$, before the arc appears, and $F_{arcj}$, where $1 \leq j$, to be counted from when the arc appears.

Figure 4:
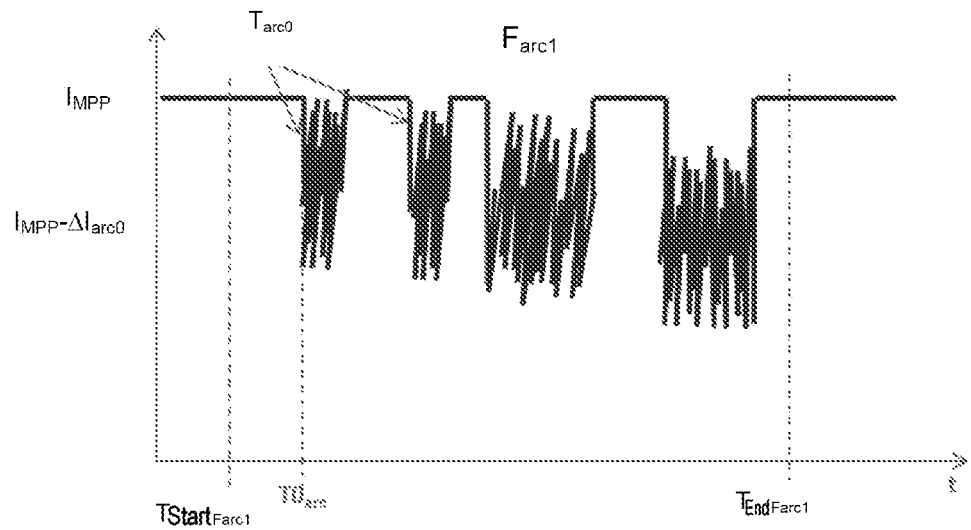
FIG. 4 shows a second example of an electric current signal produced by the photovoltaic installation of FIG. 1, broken down into acquisition windows and incorporating a plurality of current jumps linked to electric micro-arcs within the installation.

FIG. 4 shows a second example of an electric current signal I produced by the photovoltaic installation 100 and measured by a current measurement sensor. The signal incorporates a negative current jump linked to the appearance of a discontinuous electric arc including a succession of micro-arcs (that is to say of electric arcs of short duration, typically of between 2 μs and 100 μs) that are separated by periods without an arc. The current signal is broken down into a succession of acquisition windows. In FIG. 4, only the acquisition window containing the start of the electric arc is shown. An electric arc of this type is generally linked to a connection fault (contact oxidation, weld break, unscrewed terminal, etc.). In the presence of such a connection fault, electrodes form but remain, through construction, very close to one another, or even in random contact, thereby leading to random electrical connections. An electric arc may appear between these electrodes and last between a few microseconds and a few hundred microseconds. Through melting of the electrode materials, a solder bridge may be created, thus re-establishing electrical contact between the electrodes, and then break again under the Joule effect of the current, thus causing the appearance of a new arc of short duration. This alternation of appearance and disappearance of an arc of short duration may be repeated several times and thus generate a succession of electric arcs of short durations that are separated by periods without an arc.

The photovoltaic installation 100 furthermore comprises a sensor 5 for measuring the electric current I produced by the installation 100, an electric arc detection device 7, a device 8 for evaluating the energy released by a detected electric arc and an intervention or protection device 9.

The current measurement sensor 5 comprises for example a resistor 50, such as a shunt resistor, positioned on an electrical link of the photovoltaic installation 100 (for example at the input of the inverter 2, as shown in FIG. 1), and a voltage measurement sensor 51 intended to measure the voltage across the terminals of the resistor 50 that is the direct image of the current I by a known proportionality factor. The current I supplied by the photovoltaic installation 100 is specifically proportional to the voltage U across the terminals of the resistor 50, in accordance with the relationship: $I=1/R*U$ (R representing the value of the resistor 50). The voltage U measured here is therefore the image of the DC current I delivered by the photovoltaic installation 100. A different type of current measurement sensor could be used, however. The current measurement sensor 5 operates at a high sampling frequency, in this case greater than or equal to 50 kHz. In the example described here, the sampling frequency is equal to 200 kHz.

The measurement sensor 5 is linked to a buffer memory 6 intended in particular for storing the measured current signal.

The role of the electric arc detection device 7 is to detect an electric arc occurring in the photovoltaic installation 100. It is designed to implement an electric arc detection method that is preferably capable of quickly detecting the appearance of an electric arc, preferably within a maximum period of a few hundred microseconds after this appearance. The detection method may be based on the detection of a positive voltage jump, as described for example in patent document FR3002645, or on a current measurement, in particular on the detection of a negative current jump linked to the appearance of the arc, as described in the French patent application filed under number 1561622. The detection device 7 is linked to one or more voltage or current measurement sensors, depending on the arc detection method that is implemented, by communication links. With the installation being equipped with a high-frequency current measurement sensor 5, the electric arc detection could advantageously be based on the measurement of the current.

The role of the device 8 for evaluating the energy released by a detected electric arc is to evaluate the amount of energy produced or released by an electric arc detected by the detection device 7. It comprises the following modules:

a module 80 for obtaining an electric current signal produced by the installation;

a module 81 for processing the obtained current signal;

a module 82 for evaluating the arc voltage;

a module 83 for determining the energy of the arc;

a processing or control unit 84, in this case a microprocessor, to which all of the modules 80 to 83 are linked and that is intended to control the operation thereof;

a memory 85.

The module 80 for obtaining the current signal is linked to the buffer memory 6, which stores the current signal measured by the measurement sensor 5.

The processing module 81 is designed to break down the measured current signal into a plurality of acquisition windows denoted $F_x$. Each window contains a number $N_f$ of acquisition points (that is to say of measured/sampled voltage values). For each acquisition window $F_x$, the module 81 calculates an average value of the voltage measured over the window, denoted $V_{Fx}$. The average voltage values in relation to the various acquisition windows $F_x$ are recorded in memory 85. Thus, the voltage values determined during an arc, denoted $V_{Farcj}$, correspond to the average voltage values calculated in relation to the acquisition windows $F_{arc}$ during the electric arc. Moreover, the processing module 81 is intended to determine an initial value of the current before an electric arc appears, the magnitude of a current jump linked to the appearance of an electric arc and current values after the electric arc appears, from the measured current signal, as will be described in the description of the method.

The module 82 is intended to evaluate arc voltage values from the current values determined during the arc and from the initial value of the current, as will also be described in greater detail in the description of the method.

The module 83 is intended to determine the energy of an electric arc by integrating, over time, evaluated arc voltage values and current values determined during the arc, as will be described in greater detail in the description of the method.

The modules 81, 82 and 83 are software modules intended to be executed by the processing unit 84 in order to implement the steps of the evaluation method that will be described further on. The processing unit 84 is also intended to transmit a protection order to the intervention device 9, in the event of detection of an electric arc, in particular of an electric arc that has released a critical energy. The role of the intervention device 9 is to interrupt such an electric arc in order to prevent any risk of damage or of fire. The energy evaluation device 8 is linked to the intervention device 9 by a communication link 10.

The electric arc detection device 7, the device 8 for evaluating the electrical energy produced by the detected electric arc and the intervention device 9 form a safety system for the photovoltaic installation 100.

Figure 6:
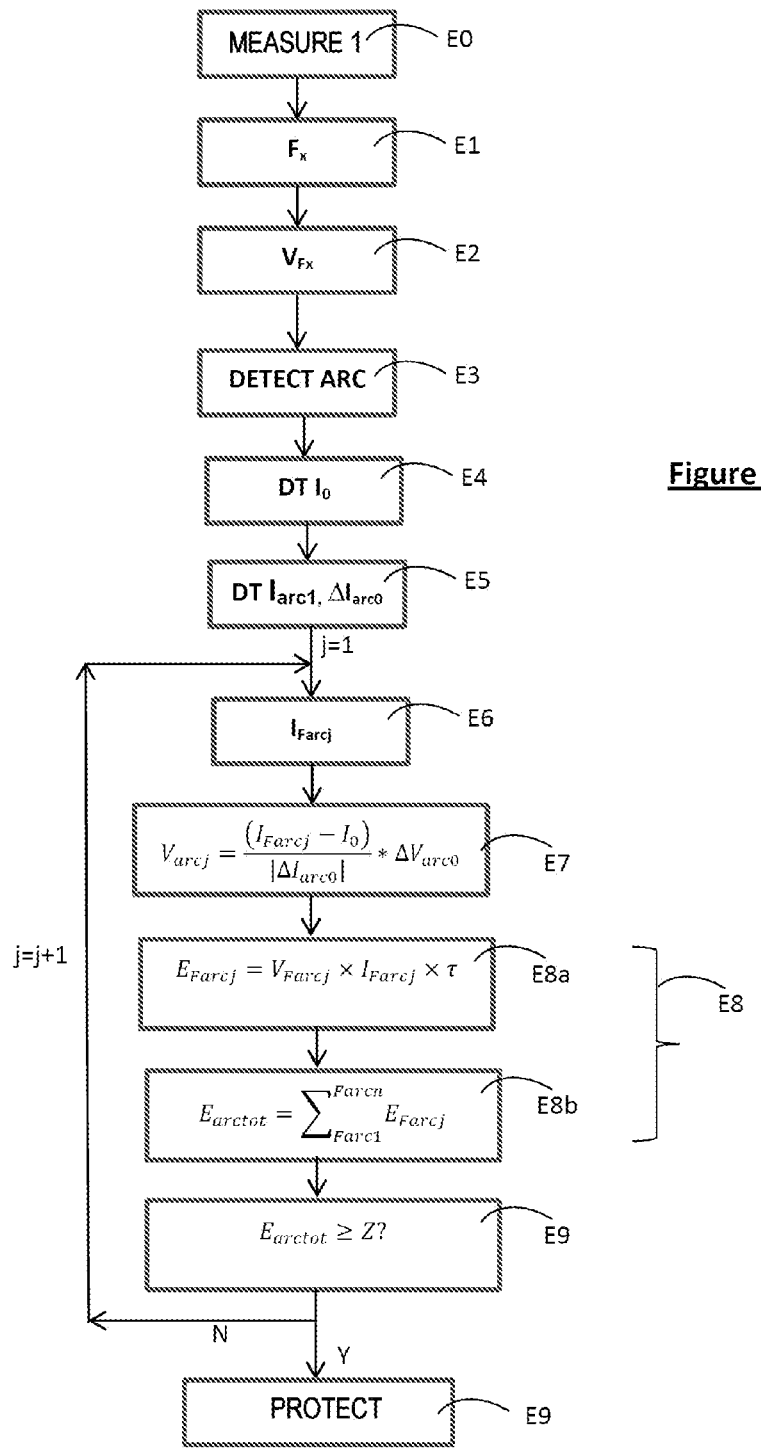
FIG. 6 shows a flow chart of the steps of the evaluation method, according to one particular embodiment of the invention.
Figure 7:
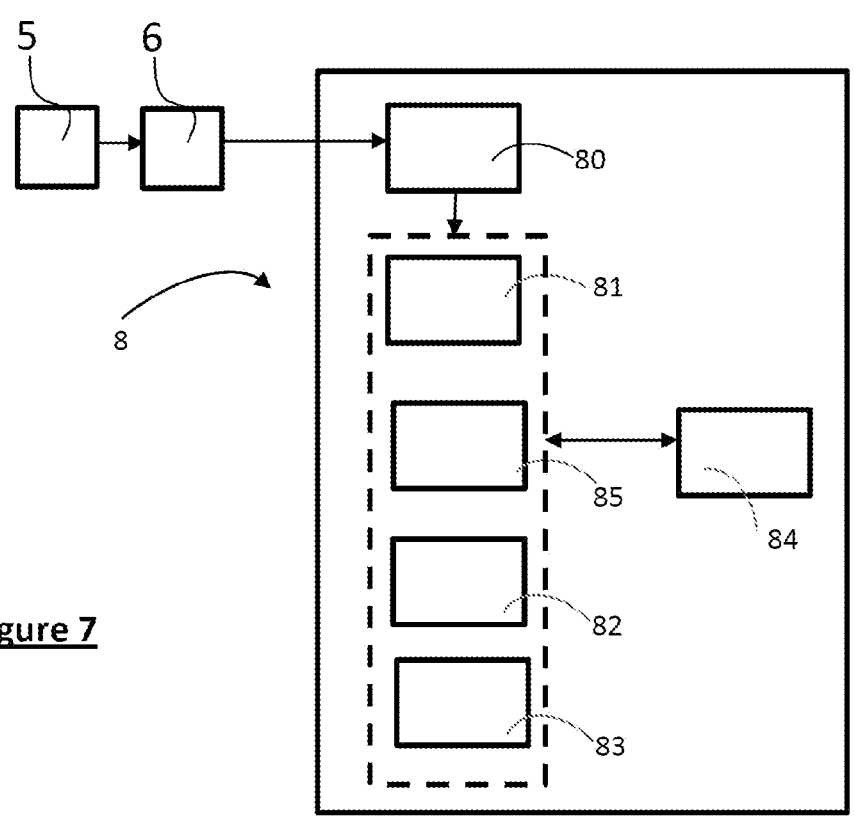
FIG. 7 shows a functional block diagram of the evaluation device according to one particular embodiment of the invention, designed to implement the method of FIG. 5.

A description will now be given of one particular embodiment of the method for evaluating the electrical energy produced by an electric arc detected in the photovoltaic installation 100, with reference to FIG. 6.

The method comprises a step E0 of acquisition or of measurement, in this case by the measurement sensor 5, of an electric current signal I produced by the installation 100. The measured current signal I is in this case recorded in memory 6 and is able to be obtained by the module 80 of the energy evaluation device 8. The measured signal is sampled at a high sampling frequency $F_{ech}$, greater than or equal to 50 kHz, for example equal to 200 kHz.

The measured current signal I is broken down into a succession of acquisition windows $F_x$ in a step E1. This is implemented by the module 81 for processing the signal. Each acquisition window $F_x$ contains a predefined set number $N_f$ of sampled current values (or acquisition points). The acquisition windows therefore have a fixed duration, in this case equal to $N_f/F_{ech}$. For each acquisition window $F_x$, the processing module 81 calculates an average value of the voltage measured over the window, denoted $V_{Fx}$, by averaging the acquisition points of the window, in a step E2. These average voltage values $V_{Fx}$ are stored in memory 85.

The method comprises a step E3 of detecting an electric arc, implemented by the arc detection device 7. This detection step E3 aims to detect an electric arc occurring in the photovoltaic installation 100. As indicated previously, the detection may be based on any known electric arc detection method, which is preferably designed to detect the arc quickly, within a maximum period of a few hundred microseconds after it appears.

$F_i$, where $1 \le i \le N$, denotes the windows prior to the appearance of the arc, $F_{arc1}$ denotes the window containing a current jump linked to the appearance of the arc, and $F_{arcj}$, where $1 < j$, denotes the windows following the appearance of the arc.

It is assumed that an electric arc, for example an electric arc such as the one shown in FIG. 3, is detected in step E3. The instant at which the electric arc appears is denoted $T0_{arc}$. At this instant $T0_{arc}$, a negative current jump occurs in the current signal, as appears in FIG. 3.

In a step E4, the energy evaluation device 8 determines an initial or nominal value $I_0$ of the current I before the electric arc appears. In the particular embodiment described here, it calculates the average value of the current in relation to the acquisition window $F_N$ preceding the window $F_{arc1}$ that contains the current jump linked to the appearance of the arc at the instant $T0_{arc}$. The initial value $I_0$ of the current before an electric arc appears is therefore equal to the average value of the current during the window $F_N$ before the appearance of the arc. As a variant, the average of the current over a plurality of acquisition windows prior to the appearance of the arc could be calculated in order to determine the initial current $I_0$.

In a following step E5, the energy evaluation device 8 determines the magnitude $\Delta I_{arc0}$ of the current jump linked to the appearance of the electric arc. To this end, it calculates for example the average value of the current $I_{arc1}$ after the current jump during the acquisition window $F_{arc1}$, and then the difference between this current value $I_{arc1}$ and the initial value of the current $I_0$. Step E4 is implemented by the module 81 for processing the current signal.

The method continues with a step E6, in which the energy evaluation device 8 determines current values $I_{Farcj}$ during the electric arc, corresponding to the average values of the current measured over the acquisition windows $F_{arcj}$ following the appearance of the electric arc (where j>1). Step E6 is implemented by the processing module 81. The determined current values $I_{Farcj}$ are recorded in memory 85.

The method then comprises a step E7 of evaluating values of the arc voltage, denoted $V_{arcj}$, in relation to the acquisition windows $F_{arcj}$ during the presence of the electric arc. In the embodiment described here, the values of the arc voltage are evaluated from the current values $I_{Farcj}$ determined during the arc and from the initial value of the current $I_0$. To evaluate each arc voltage value $V_{arcj}$, the difference between a current value $I_{Farcj}$ determined during the arc and the initial current value $I_0$ is calculated, and this difference is multiplied by the ratio between a magnitude of a voltage jump $\Delta V_{arc0}$ and a corresponding magnitude (in absolute value) of a current jump $\Delta I_{arc0}$, which jumps are linked to the appearance of the electric arc. In other words, the arc voltage $V_{arcj}$ is estimated using the following relationship:

$$V_{arcj} = \frac{(I_{Farcj} - I_0)}{|\Delta I_{arc0}|} * \Delta V_{arc0}$$

The value of the voltage jump $\Delta V_{arc0}$ is predefined, as explained above. It is between 12 V and 35 V in this case. In the exemplary embodiment described here, it is set at 20 V.

Step E7 is implemented by the module 82 for evaluating the arc voltage.

Next, in a step E8, the energy evaluation device 8 calculates the energy of the detected electric arc by integrating, over time, the product of the evaluated arc voltage values $V_{Farcj}$ and the determined current values $I_{Farcj}$. The integration over time may be performed by implementing the following sub-steps:

a) Calculating the arc energy for each acquisition window during the electric arc, and then
b) Calculating the sum of the arc energies thus calculated for a succession of acquisition windows covering the electric arc.

Thus, in a sub-step E8a), the arc energy $E_{Farcj}$ for each window $F_{arcj}$ (that is to say the energy generated by the arc during a window $F_{arcj}$) is calculated in accordance with the following relationship:

$$E_{Farcj} = V_{Farcj} \times I_{Farcj} \times \tau,$$

$$\text{where } \tau = \frac{N_f}{F_{ech}}$$

Then, in a sub-step E8b), the total electric arc energy generated by the arc during a number n of successive windows $F_{arcj}$, n being the total number of windows $F_{arcj}$ at the instant under consideration, is calculated using the following relationship:

$$E_{arctot} = \sum_{Farc1}^{Farcn} E_{Farcj}$$

Step E8 is implemented by the module 83 for determining the arc energy throughout the duration of the arc and, where appropriate, reiterated at each new acquisition window in order to update the determined value of the arc energy.

Step E8 of evaluating the energy $E_{arctot}$ generated or produced by the electric arc may be followed by a test step E9 that makes it possible to check whether the total arc energy is greater than or equal to a critical energy threshold Z (for example expressed in joules). In other words, in step E8, the following test is performed:

$$E_{arctot} \geq Z?$$

For example, the threshold Z is equal to 2 joules. The value of this threshold could however be adjusted depending on the installation and on its environment.

If the test E9 is positive, with the total arc energy having reached or exceeded the threshold Z, the energy evaluation device 8 automatically sends, to the intervention device 9, an order to protect the installation 100. Next, in a step E9, the intervention device 9 protects the photovoltaic installation 100. This protection may be based on remotely controlled switches. It may consist of an order to interrupt the operation of the photovoltaic installation, thereby making it possible to stop the stray electric arc and to eliminate any risk of damage and/or of starting of a fire.

If the test E9 is negative, with the total arc energy being less than the threshold Z, steps E6 to E9 are reiterated for the following acquisition window (j=j+1).

As a variant, various levels of criticality of the electric arc could be defined, for example:

'level 1', corresponding to a total arc energy $E_{arctot}(t)$ strictly less than 1 joule;
'level 2', corresponding to a total arc energy $E_{arctot}(t)$ greater than or equal to 1 joule and strictly less than 2 joules;
'level 3', corresponding to a total arc energy $E_{arctot}(t)$ strictly greater than 2 joules.

Level 1 corresponds to an electric arc that does not pose a safety risk. The evaluation device 8 may possibly signal the presence of an electric arc that does not pose a safety risk to an operator. Said operator may decide not to activate the warning for this level.

Level 2 corresponds to an electric arc that does not pose an immediate safety risk, but that could possibly become dangerous. In this case, the evaluation device 8 signals, to the operator, the presence of an electric arc that does not pose an immediate safety risk but requires a quick intervention in order to identify the fault underlying the arc and correct said fault.

Level 3 corresponds to a dangerous electric arc. The evaluation device 8 orders the intervention device 9 to protect the photovoltaic installation 100 immediately, as described above.

In the embodiment that has just been described, the detected electric arc (as shown in FIG. 3) is a continuous arc of long duration. In another embodiment, the detected electric arc is discontinuous. It comprises a succession of micro-arcs that are separated by periods without an arc. FIG. 4 shows an example of a discontinuous electric arc during an acquisition window, in this case the window containing the first micro-arcs. In this case, the energy evaluation device 8 identifies the micro-arcs and, for each micro-arc, determines the average value of the current during this micro-arc, and then evaluates the corresponding voltage value, as explained above. It then evaluates the energy of each micro-arc. The device 8 stores the energies evaluated in relation to the identified micro-arcs in memory, and then sums these energies in order to obtain the total energy generated by the electric arc. Test E9 is then implemented in order, where necessary, to order protection of the photovoltaic installation 100.

The invention claimed is:

1. A method for evaluating electrical energy produced by an electric arc in a photovoltaic installation, the method comprising:
   a) measuring an electric current signal produced by the photovoltaic installation at a sampling frequency greater than or equal to 50 kHz and, from the measured electric current signal:
      determining an initial value of the electric current before the electric arc appears;
      determining current values during the electric arc;
   b) evaluating values of an arc voltage from the current values determined during the electric arc and from the initial value of the current;
   c) integrating, over time, the product of the evaluated arc voltage values and the determined current values, in order to determine the energy of the electric arc, and comparing the determined energy of the electric arc with an energy threshold, and performing a protecting action if the threshold is exceeded.

2. The method as claimed in claim 1, wherein, to evaluate each arc voltage value, a difference between a determined current value during the electric arc and the initial current value is calculated, and the difference is multiplied by a ratio between a magnitude of a voltage jump linked to an appearance of the electric arc and a magnitude of a current jump linked to the appearance of the electric arc.

3. The method as claimed in claim 2, wherein the magnitude of the voltage jump is predefined and in a range of from 12 V to 35 V.

4. The method as claimed in claim 2, wherein the magnitude of the current jump is determined from the measured current signal.

5. The method as claimed in claim 2, comprising breaking down the electric current signal into a plurality of acquisition windows, and, for each acquisition window, determining an average value of the electric current signal, the average value being recorded in a memory.

6. The method as claimed in claim 5, wherein, in the integrating, an arc energy for each acquisition window is calculated by taking a product of the average value of the electric current signal measured over the acquisition window, of the evaluated voltage value and of a duration of the acquisition window, and then summing the calculated arc energies in relation to a succession of acquisition windows.

7. The method as claimed in claim 2, wherein, in the event of a discontinuous electric arc including a plurality of electric micro-arcs, the evaluating b) and the integrating c) are implemented in order to determine an energy of each electric micro-arc, and then respective energies of the electric micro-arcs are summed in order to determine an energy of the discontinuous electric arc.

8. The method as claimed in claim 2, wherein the magnitude of the voltage jump is predefined and equal to 20 V.

9. The method as claimed in claim 1, comprising breaking down the electric current signal into a plurality of acquisition windows, and, for each acquisition window, determining an average value of the electric current signal, the average value being recorded in a memory.

10. The method as claimed in claim 9, wherein, in the integrating, an arc energy for each acquisition window is calculated by taking a product of the average value of the electric current signal measured over the acquisition window, of the evaluated voltage value and of a duration of the acquisition window, and then summing the calculated arc energies in relation to a succession of acquisition windows.

11. The method as claimed in claim 9, wherein, in the event of a discontinuous electric arc including a plurality of electric micro-arcs, the evaluating b) and the integrating c) are implemented in order to determine an energy of each electric micro-arc, and then respective energies of the electric micro-arcs are summed in order to determine an energy of the discontinuous electric arc.

12. The method as claimed in claim 1, wherein, in the event of a discontinuous electric arc including a plurality of electric micro-arcs, the evaluating b) and the integrating c) are implemented in order to determine an energy of each electric micro-arc, and then respective energies of the electric micro-arcs are summed in order to determine an energy of the discontinuous electric arc.

13. The method as claimed in claim 1, wherein the initial value of the current is equal to an average value of the electric current signal in relation to at least one acquisition window preceding the acquisition window that contains a current jump.

14. A device for evaluating energy released by an electric arc in a photovoltaic installation, the device comprising:
 a module for obtaining an electric current signal produced by the photovoltaic installation;
 a module for processing the electric current signal, designed to determine an initial value of the electric current signal before the electric arc appears and current values during the electric arc;
 a module for evaluating arc voltage values from the determined current values and from the initial value of the electric current signal;
 a module for integrating, over time, a product of the evaluated arc voltage values and the determined current values, in order to determine an energy of the electric arc, and
 an intervention device intended to protect the photovoltaic installation in the event of an electric arc.

15. The device as claimed in claim 14, wherein the module for evaluating arc voltage values is designed to calculate a difference between a determined current value during the electric arc and the initial current value and multiply the difference by a ratio between a magnitude of a voltage jump linked to an appearance of the electric arc and a magnitude of a current jump linked to the appearance of the electric arc.

16. The device as claimed in claim 14, wherein the module for processing the electric current signal is designed to break down the electric current signal into a plurality of acquisition windows, and, for each acquisition window, determine an average value of the electric current signal measured over the acquisition window, the average value of the electric current signal being recorded in memory.

17. The device as claimed in claim 16, wherein the integration module is designed to calculate, for each acquisition window, an arc energy by taking a product of the average value of the electric current signal measured over the acquisition window, of the evaluated voltage value and of a duration of the acquisition window, and then to sum the calculated arc energies in relation to a succession of acquisition windows.

18. A safety system for a photovoltaic installation, comprising a device for detecting an electric arc, a device for evaluating the energy released by the detected electric arc as claimed in claim 14.

19. A photovoltaic installation, comprising the safety system as claimed in claim 14.

* * * * *